(12) United States Patent
Ledwell et al.

(10) Patent No.:     US 12,699,987 B2
(45) Date of Patent:          Aug. 4, 2026

(54) TRANSACTION SYSTEM WITH ACCOUNT MAPPING

(71) Applicant: Royal Bank of Canada, Toronto (CA)

(72) Inventors: Lauren Ledwell, Toronto (CA); Steven Noseworthy, Toronto (CA); Arnold Badal-Badalian, Toronto (CA)

(73) Assignee: ROYAL BANK OF CANADA, Toronto (CA)

( * ) Notice: Subject to any disclaimer, the term of this patent is extended or adjusted under 35 U.S.C. 154(b) by 72 days.

(21) Appl. No.: 16/690,636

(22) Filed: Nov. 21, 2019

(65) Prior Publication Data

US 2020/0160323 A1     May 21, 2020

Related U.S. Application Data

(60) Provisional application No. 62/770,579, filed on Nov. 21, 2018.

(51) Int. Cl.
| | |
|---|---|
| *G06Q 20/36* | (2012.01) |
| *G06N 20/00* | (2019.01) |
| *G06Q 20/22* | (2012.01) |
| *G06Q 20/40* | (2012.01) |
| *G06Q 20/42* | (2012.01) |

(52) U.S. Cl.
CPC ......... *G06Q 20/3674* (2013.01); *G06N 20/00* (2019.01); *G06Q 20/227* (2013.01); *G06Q 20/401* (2013.01); *G06Q 20/42* (2013.01); *G06Q 2220/00* (2013.01)

(58) Field of Classification Search
CPC ............. G06Q 20/3674; G06Q 20/227; G06Q 20/401; G06Q 20/42; G06Q 2220/00; G06Q 20/204; G06Q 20/22; G06Q 20/3821; G06Q 20/385; G06N 20/00
See application file for complete search history.

(56) References Cited

U.S. PATENT DOCUMENTS

| | | | | |
|---|---|---|---|---|
| 2007/0194113 | A1* | 8/2007 | Esplin .................... | G06Q 20/40 |
| | | | | 705/16 |
| 2008/0134295 | A1* | 6/2008 | Bailey .................... | G06F 21/30 |
| | | | | 726/4 |
| 2018/0018660 | A1* | 1/2018 | Gomes ................. | H04L 63/102 |

(Continued)

FOREIGN PATENT DOCUMENTS

| | | | | |
|---|---|---|---|---|
| CN | 107026836 A | * | 8/2017 | ....... G06K 19/07758 |

OTHER PUBLICATIONS

"Towards an interoperable mobile wallet service", Pradipta De, 2013 10th International Conference and Expo on Emerging Technologies for a Smarter World (CEWIT) (Year: 2013).*

*Primary Examiner* — Duan Zhang

(57) ABSTRACT

Processing a transaction includes receiving transaction data for a transaction performed at a merchant, the transaction data including a tokenized universal identifier, a merchant identifier, and a transaction variable; detokenizing the transaction data to determine a universal identifier; identifying multiple accounts associated with the universal identifier; selecting, from the multiple accounts, an account to assign to the transaction, based at least in part on the universal identifier, the merchant identifier, and the transaction variable; and sending account information associated with the selected account to a payment processor to authorize the transaction.

20 Claims, 7 Drawing Sheets

(56)                   References Cited

U.S. PATENT DOCUMENTS

| | | | |
|---|---|---|---|
| 2018/0137530 A1* | 5/2018 | Wheeler | ............ G06Q 30/0207 |
| 2018/0376378 A1* | 12/2018 | Greene | .............. G06Q 20/3265 |
| 2020/0005270 A1* | 1/2020 | Griffith | ................. G06Q 20/20 |
| 2020/0074449 A1* | 3/2020 | Novis | ................. G06Q 20/227 |

* cited by examiner

202

500

600

| Card | Merchant | Days of Week | Time of Day |
|------|----------|--------------|-------------|
| Card 1 | Merchant A | Any | Any |
| Card 2 | Merchant B | Weekdays | Any |
| Card 3 | Merchant B | Weekend | Any |
| Card 3 | Merchant C | Any | Any |

FIG. 6

TRANSACTION SYSTEM WITH ACCOUNT MAPPING

CROSS-REFERENCE TO RELATED APPLICATIONS

This application claims priority from U.S. Provisional Patent Application No. 62/770,579 filed on Nov. 21, 2018, the entire contents of which are incorporated by reference herein.

FIELD

This relates to tokenized transaction processing, and in particular managing tokenized purchase transactions across multiple banking accounts, for example, business and personal spending accounts.

BACKGROUND

An individual such as a business owner may have multiple banking accounts and revolving accounts (such as credit cards) across business and personal finances, for use as payment sources during a transaction at a merchant.

During a transaction at a merchant, an individual may select a card and/or account at the point of sale for use in the transaction. Merchant receipts based on completed transactions may be collected for future expense management. Following a completed transaction, funds may be transferred between various accounts to properly fund the account selected. Once the accounts have been manually adjusted, the account information may be exported to financial accounting software for reconciliation.

As such, it may be a time intensive process to manage finances across multiple accounts and across business and personal accounts using existing accounting techniques and software.

SUMMARY

According to an aspect, there is provided a computer-implemented method for processing a transaction, the method comprising: receiving transaction data for a transaction performed at a merchant, the transaction data including a tokenized universal identifier, a merchant identifier, and a transaction variable; detokenizing the transaction data to determine a universal identifier; identifying multiple accounts associated with the universal identifier; selecting, from the multiple accounts, an account to assign to the transaction, based at least in part on the universal identifier, the merchant identifier, and the transaction variable; and sending account information associated with the selected account to a payment processor to authorize the transaction.

In some embodiments, the universal identifier is associated with a user.

In some embodiments, the selecting includes performing a lookup of a lookup table.

In some embodiments, the selecting includes a lookup of a merchant map associated with the universal identifier, the merchant map defining transaction variables associated with the multiple accounts.

In some embodiments, the transaction variable includes a date of the transaction.

In some embodiments, the transaction variable includes a time of the transaction.

In some embodiments, the transaction variable includes a location of the transaction.

In some embodiments, the method further comprises: categorizing the transaction based at least in part on the merchant identifier and wherein the selecting is based at least in part on the categorization of the transaction.

In some embodiments, the selecting is based at least in part on terms associated with each of the multiple accounts.

In some embodiments, the selecting is based at least in part on costs associated with each of the multiple accounts.

In some embodiments, the method further comprises: receiving an authorization response from the payment processor and sending the authorization response to an acquiring financial institution.

In some embodiments, the selected account is tokenized.

In some embodiments, the method further comprises: de-tokenizing the selected account prior to sending account information to the payment processor.

In some embodiments, the method further comprises: upon none of the multiple accounts is associated with the universal identifier, the merchant identifier, and the transaction variable, selecting a default account.

In some embodiments, the selecting is based at least in part on learning a model based on historical transactions associated with the universal identifier.

In some embodiments, the method further comprises: receiving a confirmation that a user approves the selected account.

In some embodiments, the method further comprises: updating the model based on the confirmation.

In some embodiments, the method further comprises: tokenizing the universal identifier and sending the tokenized universal identifier to a computing device associated with a user.

According to another aspect, there is provided a computer system comprising: a processor; a memory in communication with the processor, the memory storing instructions that, when executed by the processor cause the processor to perform a method described herein.

According to a further aspect, there is provided a non-transitory computer-readable medium having computer executable instructions stored thereon for execution by one or more computing devices, that when executed perform a method described herein.

Other features will become apparent from the drawings in conjunction with the following description.

BRIEF DESCRIPTION OF DRAWINGS

In the figures which illustrate example embodiments,

FIG. 6 illustrates an example of a merchant map maintained by the software of FIG. 4.

DETAILED DESCRIPTION

Figure 1:
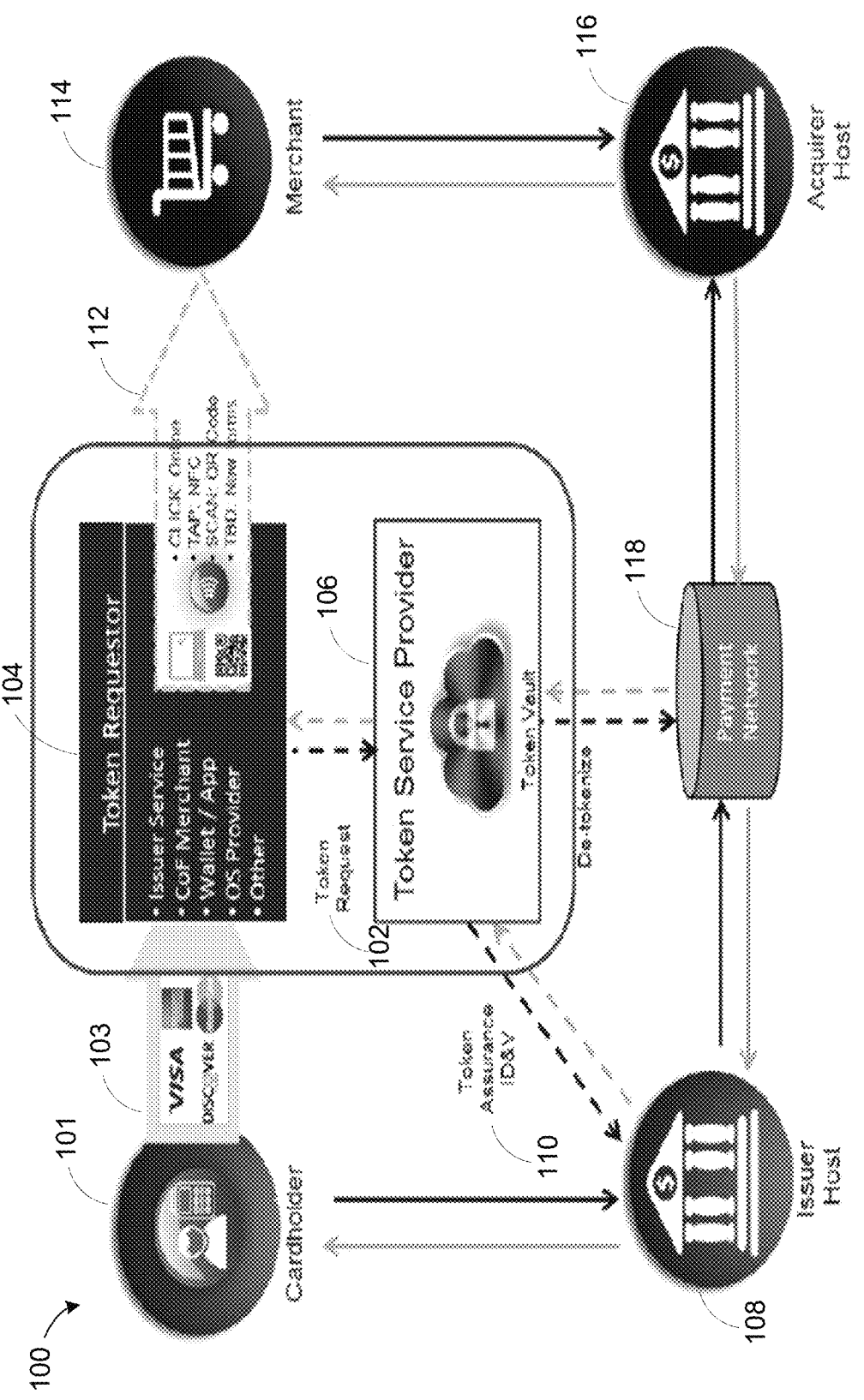
FIG. 1 is a schematic diagram of an electronic payment ecosystem, according to an embodiment.

Electronic payments are a type of electronic signal exchange, or electronic data transaction, that have provided significant benefits to human kind. In addition to numerous benefits, such transactions are associated with numerous risks. Although many different forms of such transactions have been proposed, there remains significant room for improvement, including for example in terms of security, efficiency, and convenience in usability, particularly for purchasers, account administrators, and merchants.

Mobile and other e-commerce payments are categories of electronic payment initiated from mobile, desktop, and/or other devices, as opposed to more conventional forms of payments, such as cash, debit cards, credit cards, and/or pre-paid cards. Some mobile and e-commerce payment transactions utilize mobile or other virtual wallets, which are programs or applications on a user's device that store the user's personal information, including credentials for one or more authorized payment methods. For example, the user may input and store multiple credit card numbers, bank account numbers, coupons, loyalty, gift, and reward program account numbers, and others, and, using logical functionality built into the wallet(s), select which of several payment forms to use in association with a transaction, designate and confirm payment amounts and other transaction details, and otherwise manage or control transactions and accounts to be used in transactions. The use of secure elements, encryption, tokenization, and other techniques can be used to enhance the security of mobile and other virtual wallets and protect the user's payment credentials and other sensitive information stored inside.

While virtual wallets have provided improved convenience for purchasers and account holders, they have tended to be limited to the use of single funding or payment accounts. Moreover, to date such wallets have been tied to individual account administrators, such as issuing financial institutions (FIs) for credit cards, banks for demand/deposit accounts, etc. This can result in significant inconvenience for the consumer, or other purchaser, who is authorized to complete transactions by drawing on accounts administered by more than one FI and who, in order to do so, must deal with multiple virtual wallets on a single device.

To initiate many types of transaction using a virtual wallet, a user can approach a merchant point-of-sale (POS) terminal and present the mobile device for scanning or some other type of data exchange. For example, in a Near Field Communication (NFC) transaction, an NFC reader will request payment credentials and/or other transaction-specific information from the mobile device when the two are brought into close proximity with one another. Similarly, payment credentials and transaction information can be exchanged between a mobile wallet and merchant POS terminal using visual patterns, such as barcodes and QR codes, which are displayed on the mobile device for scanning by the merchant POS terminal. Mobile payment transactions may also require some type of user authentication, such as the inputting of a PIN or identifying biometric, before they will be processed, although user authentication is not always required.

Alternatively, electronic transactions may be initiated by using mobile or stationary computing devices to navigate to or otherwise access merchant e-commerce websites and/or applications, and thereafter using input devices such as keyboards, keypads, touchscreens, etc., to enter commands adapted to initiate communications sessions with associated merchant transaction systems.

Whether initiated at a merchant POS terminal or from a networked mobile or desktop device accessing a website, such as an application or other program associated with a merchant, transaction data may also be transmitted via one of potentially many different payment networks for processing, authorization, and settlement with a bank or financial institution. It may be convenient or otherwise advantageous for a purchaser to use one of multiple accounts available to the purchaser to complete a transaction, for example, on the basis of the primary usage of an account such as for personal use or business use, which accounts may or may not be associated with a bank or other account administrator acceptable to a merchant, or may offer or not offer advantageous interest rates, loyalty points, or other rewards, a particular merchant may not accept a certain type of payment, and/or one or more demand deposit accounts may not have adequate funds (or other payment resources) available to complete a transaction. Selection of an account to use for a transaction may be made either with or without active or manual input from a user at the time of the transaction.

FIG. 1 is a schematic diagram of an example electronic payment ecosystem 100 using payment tokenization. Tokenization allows for a Primary Account Number (PAN), for example, a credit card account number, to be replaced with a surrogate value used in transactions in its place.

The tokenization process starts with a token request 102 from a token requestor 104 to a token service provider ("TSP") 106. Token request 102 may be initialized by a user or a cardholder 101 presenting a PAN 103 to token requestor 104. The PAN can be in the form of a credit card number, as illustrated in FIG. 1. Token requestor 104 may be, for example, an issuer service, a CoF merchant, a mobile wallet or application, an OS provider, or other suitable token requestor.

TSP 106 may store PAN values such as PAN 103 in a token vault, and during tokenization or token issuance replaces PAN 103 with a surrogate value to form a token. The token vault is a data storage, for example, a centralized secured server where tokens are created and the PAN number they correspond with are stored.

TSP 106 may request an issuer host 108 to perform identification and verification (token assurance ID&V 110) during token issuance. As shown in FIG. 1, issuer host 108 may also be in communication with cardholder 101. After token assurance ID&V 110 process is complete, TSP 106 returns a token to token requestor 104, for example, on a user's mobile device.

As illustrated, a user may initiate a payment transaction 112 at a merchant 114. Payment transaction 112 at merchant 114 may be initiated by way of clicking online, tapping using NFC, scanning a QR code, or other forms of payment, and includes token data being sent from token requestor 104 to merchant 114.

Data related to payment transaction 112, including token data, is sent to an acquirer host 116 as an authorization request. Acquirer host 116 sends an authorization request to a payment network 118.

Payment network 118 then sends token data from the authorization request to TSP 106 for token cryptogram validation and detokenization. Once the detokenization process is complete, the transaction is sent to issuer host 108 for financial authorization. An authorization response may then be sent from issuer host 108 to acquirer host 116, via payment network 118, and then finally to merchant 114, to complete the transaction.

Figure 2:
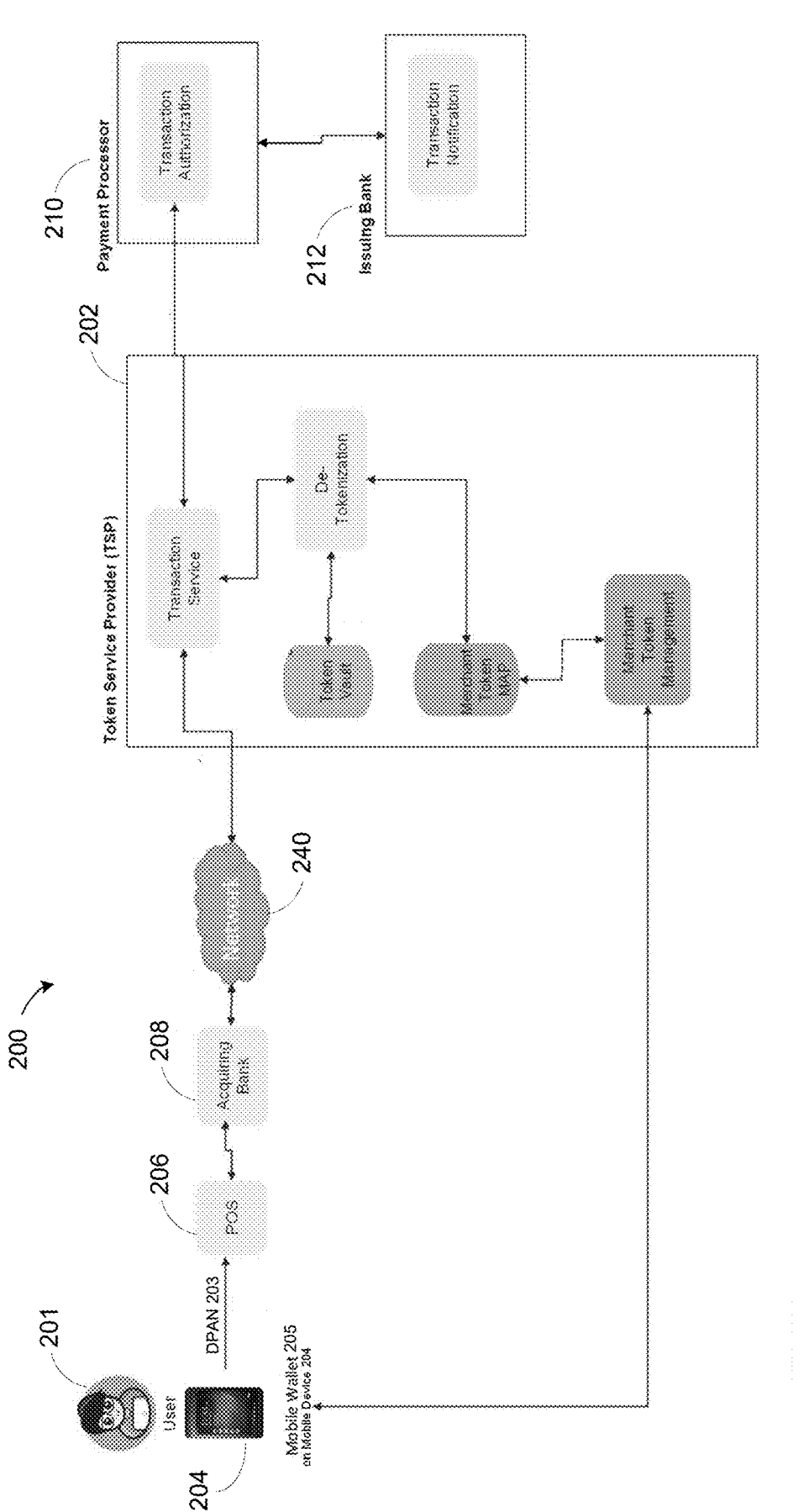
FIG. 2 is a schematic diagram of an operating environment of an electronic payment ecosystem with account mapping, according to an embodiment.

FIG. 2 is a schematic diagram of an operating environment of a payment ecosystem 200 with a transaction system such as a token service provider ("TSP") 202 used for account mapping, according to an embodiment.

As illustrated in FIG. 2, a mobile device 204 associated with a user 201, such as a customer or a purchaser, is in communication with a point of sale ("POS") 206 at a merchant, in an example, by way of near field communication. Mobile device 204 is also in communication with a token service provider ("TSP") 202 by way of a communications network such as a network 240. Network 240 may, for example, be a packet-switched network, in the form of a LAN, a WAN, the public Internet, a Virtual Private Network (VPN) or the like. POS 206 is in communication with acquiring bank 208, in an example, by way of a communications network such as network 240. Acquiring bank 208 is also in communication with TSP 202 by way of network 240. TSP 202 is further in communication by way of a communications network with a payment processor 210, and payment processor 210 is in turn in communication with an issuing bank 212 by way of a communication network.

In embodiments of a payment ecosystem 200 disclosed herein, a purchaser or cardholder such as a user 201, may complete a transaction with a single universal identifier that is authorized to access multiple accounts or other funding sources, and the source may be automatically selected on the basis of a transaction variable such as the merchant of the purchase transaction.

In some embodiments, the universal identifier may be a universal card and money management application. In an example, the universal identifier may be associated with a single spending card for all business and personal affairs.

In some embodiments, a universal identifier may be associated with a physical universal card. In an example, a universal card may be a Kiwi universal card implemented in the Royal Bank of Canada™ cards line of business.

A universal identifier includes or may be associated with an account map or a merchant map 600 which links a multiple accounts (or cards) as funding sources, identifying a transaction variable to which each source applies, such as the merchant of the purchase transaction, day of the week the transaction takes place, and time of day that the transaction takes place.

In some embodiments, the universal identifier may be tokenized in a suitable manner at TSP 202 and sent to mobile device 204, thus generating a DPAN 203 (device or digital primary account number) for the universal identifier. Thus, TSP 202 may be the issuer of DPAN 203. Tokenization allows for the universal identifier to be replaced with a surrogate value used in transactions in its place. In some embodiments, a universal identifier may be tokenized using one or more components of electronic payment ecosystem 100.

In some embodiments, the universal identifier may be associated with an identifier of user 201.

In some embodiments, mobile device 204 is associated with user 201 and may store a mobile wallet 205 program or application implemented as software and/or hardware, and may store personal information for user 201, including credentials for one or more authorized payment methods. One such payment method may use a universal identifier, as described herein, that may be used for a purchase transaction at POS 206.

Using logical functionality built into mobile wallet 205 of mobile device 204, user 201 may select which of several payment methods to use in association with a transaction at POS 206, designate and confirm payment amounts and other transaction details, and otherwise manage or control transactions and accounts to be used in transactions.

Mobile wallet 205 of mobile device 204 may provide capability for the user to define default payment cards or accounts for a transaction variable such as a merchant during specific times, by way of a merchant map 600, that may be stored and managed at TSP 202.

Mobile device 204 may be a computing device. Example mobile devices include without limitation, cellular phones, cellular smart-phones, wireless organizers, pagers, personal digital assistants, computers, laptops, handheld wireless communication devices, wirelessly enabled notebook computers, portable gaming devices, tablet computers, or any other portable electronic device with processing and communication capabilities. In at least some embodiments, mobile devices as referred to herein can also include without limitation, peripheral devices such as displays, printers, touchscreens, projectors, digital watches, cameras, digital scanners and other types of auxiliary devices that may communicate with another computing device.

In one example, mobile device 204 may be a smartphone. In another example, the computing device may be a touchscreen enabled device and the other a type of communication device (e.g., a router) for connecting to other devices. As will be apparent, other types of computing devices can be envisaged that benefit from interconnection and interoperability.

Mobile device 204 may include long-range or network communications component(s) and/or short-range network communications component(s) that provide the mobile device with various different voice and data communication functions. In some embodiments, short-range communications enabled by short-range of near-field communications component(s) may include a near field communications (NFC) subsystem that may be utilized to communicate with an NFC reader, among various different purposes or functions, so as to initiate contactless mobile payments with a merchant POS terminal such as POS 206.

In some embodiments, TSP 202 communicates with mobile device 204, acquiring bank 208, and payment processor 210, in an example, by way of network 240.

In some embodiments, TSP 202 is implemented on a computing device described with reference to FIGS. 3 and 4, below. Software at TSP 202 may, for example, store and manage account maps such as merchant maps 600. A merchant map 600 stores information about cards associated with a universal identifier, or user 201. For example, "Card" may define an account card associated with the user, "Merchant" a merchant that is associated with that card, "Days of the Week" to associate that card with that merchant, as well as "Time of Day" at which to associate that card with that merchant.

Software at TSP 202 may also be configured to receive transaction information, tokenize and detokenize universal identifiers, tokenize and detokenize a DPAN 203 to an FPAN (funding primary account number, and map transactions to accounts or cards, as described in further detail below.

DPAN 203 may be a token generated, for example, by a payment network, issuing bank 212, or TSP 202, that identifies a card or account associated with an FPAN used by issuing bank 212 to identify the same card and/or account. An FPAN may be the number of the actual account or card, and in some embodiments, may appear on the physical card (or similar device) issued by issuing bank 212.

POS 206 may be a point-of-sale terminal at a merchant. The point-of-sale may be a place, or device such as a computing device, where a customer such as user 201 executes payment for goods or services at the merchant. Mobile device 204 associated with user 201 may communicate with POS 206, in an example, by way of a Near Field Communication (NFC) transaction to exchange purchase transaction data.

POS 206 is in communication with acquiring bank 208. Acquiring bank 208 may be a bank or financial institution that processes transactions such as credit or debit card payments on behalf of the merchant. Acquiring bank 208 may enter into an agreement with the merchant of POS 206, under which acquiring bank 208 exchanges funds with issuing banks such as issuing bank 212 to execute a purchase transaction. Acquiring bank 208 may exchange funds with issuing bank 212 on behalf of the merchant, and pay the merchant for daily payment-card activity's net balance. In an example, the daily payment-card activity's net balance may be gross sales minus reversals, interchange fees, and acquirer fees.

Payment processor 210 is in communication with TSP 202 and issuing bank 212, and may process data transfer of information between TSP 202 and issuing bank 212. Payment processor 210 may authorize transactions within payment ecosystem 200.

In some embodiments, payment processor 210 may also communicate with acquiring bank 208.

Payment processor 210 communicates with issuing bank 212. Issuing bank 212 may be a bank or financial institution that issues payment to acquiring bank 212 on behalf of its customer (the purchaser in the transaction), for example, user 201, in a purchase transaction at POS 206 of the merchant.

Figure 3:
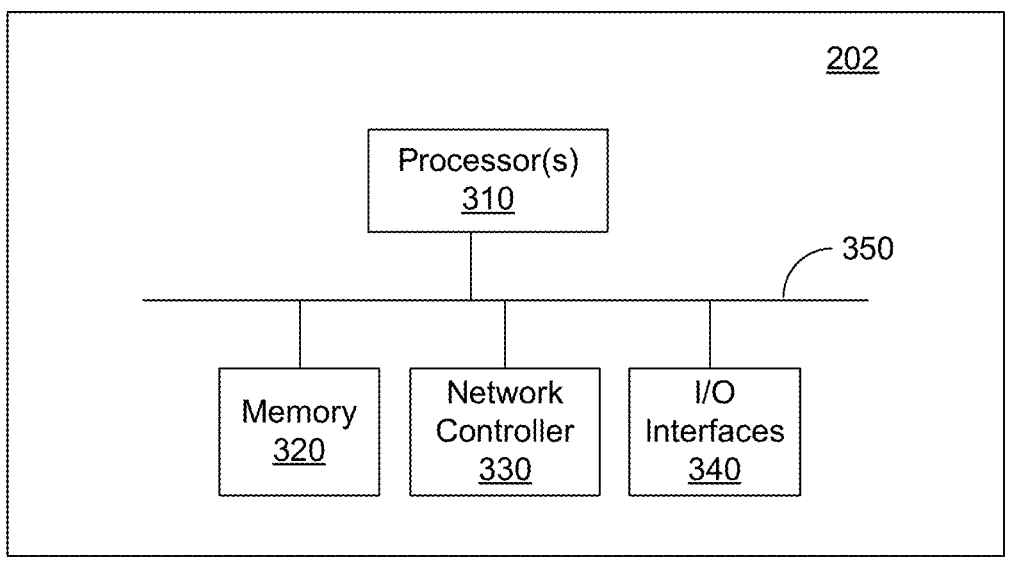
FIG. 3 is a high-level block diagram of a token service provider computing device, according to an embodiment.

FIG. 3 is a simplified block diagram of a computing device of TSP 202, according to an example embodiment. TSP 202 includes a processor(s) 310, a memory 320, a network controller 330, and one or more I/O interfaces 340 in communication over bus 350.

Processor(s) 310 may be one or more Intel x86, Intel x64, AMD x86-64, PowerPC, ARM processors or the like.

Memory 320 may include random-access memory, read-only memory, or persistent storage such as a hard disk, a solid-state drive or the like. Read-only memory or persistent storage is a computer-readable medium. A computer-readable medium may be organized using a file system, controlled and administered by an operating system governing overall operation of the computing device.

Network controller 330 serves as a communication device to interconnect the computing device with one or more computer networks such as, for example, a local area network (LAN) or the Internet.

One or more I/O interfaces 340 may serve to interconnect the computing device with peripheral devices, such as for example, keyboards, mice, video displays, and the like. Optionally, network controller 330 may be accessed via the one or more I/O interfaces.

Software instructions are executed by processor(s) 310 from a computer-readable medium. For example, software may be loaded into random-access memory from persistent storage of memory 320 or from one or more devices via I/O interfaces 340 for execution by processor(s) 310. As another example, software may be loaded and executed by processor(s) 310 directly from read-only memory.

Figure 4:
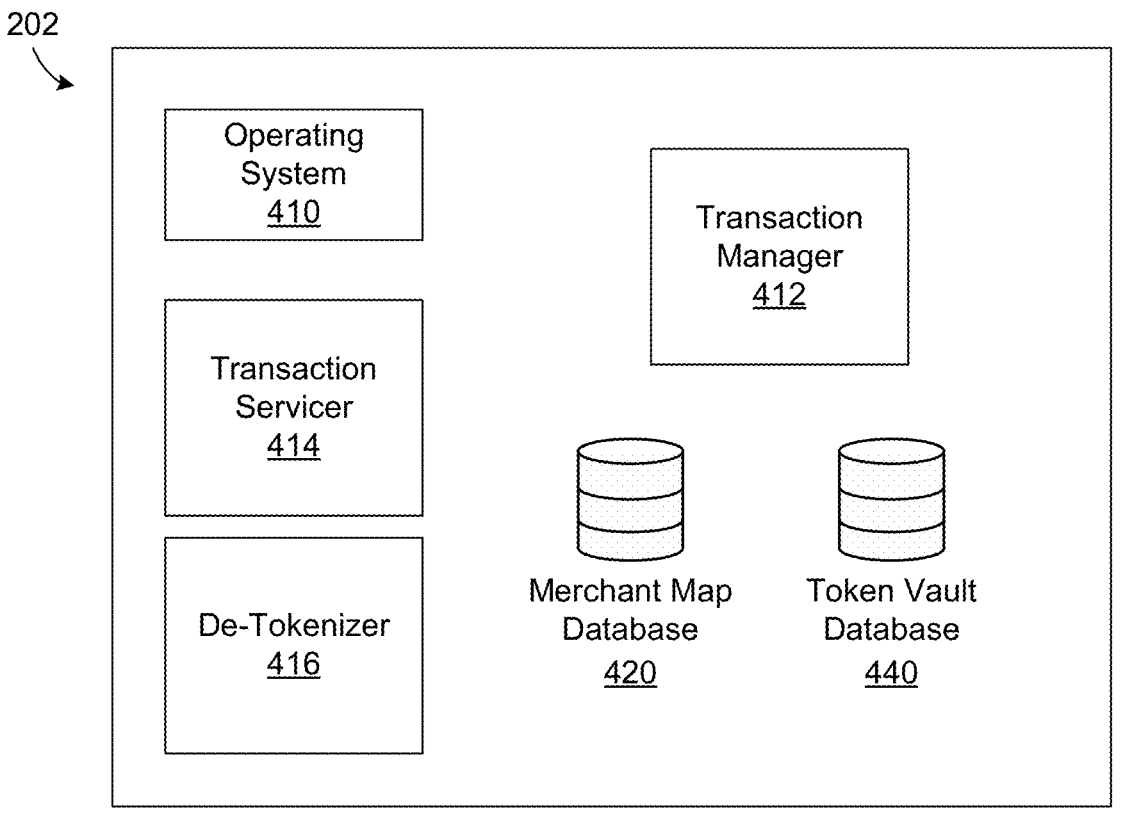
FIG. 4 illustrates the organization of software at the computing device of FIG. 3.

FIG. 4 depicts a simplified organization of example software components and data stored within memory 320 of TSP 202. As illustrated, these software components include operating system (OS) software 410, a transaction manager 412, a transaction servicer 414, a de-tokenizer 416, a merchant map database 420 and a token vault database 440.

OS software 410 may be, for example, Microsoft Windows, UNIX, Linux, Mac OSX, or the like. Generally, OS software 410 is responsible for determining the functions and features available at TSP 202, such as keyboards, touch screen, synchronization with applications, email, text messaging and other communication features as will be envisaged by a person skilled in the art. OS software 410 allows the software modules to access one or more processors 310, memory 320, network controller 330, and one or more I/O interfaces 340 of TSP 202.

Transaction manager 412 is configured to determine an account to use for a given transaction, for example, based on associations defined in a merchant map 600 retrieved from merchant map database 420.

Transaction manager 412 may be configured to generate a merchant map 600 for each universal identifier for storage in merchant map database 420, and manage merchant map database 420 with merchant maps, defined cards or accounts, merchants, or other transaction variables such as "Days of the Week" and "Time of Day".

Transaction manager 412 may also be configured to update merchant map database 420 to update merchant map 600, for example, with newly-defined cards or accounts or based on scanned receipts of previous transactions. Merchant map 600 may be updated based on data received from mobile device 204, for example, allowing a user to set certain merchant mapping preferences or overrides. Other suitable techniques for updating merchant map 600 may be contemplated.

Merchant map database 420 may be configured to store information related to merchant maps for users, such as merchant map 600 for user 201. Merchant map database 420 may include merchant maps for multiple universal identifiers associated with multiple users. An example of merchant map 600 is illustrated in FIG. 6 and described in further detail below.

Transaction servicer 414 may be configured to receive purchase transaction information from acquiring bank 208, including without limitation payment information such as a DPAN 203 that is an identifier of an account or card or a DPAN 203 that is associated with a universal identifier, and an identifier of the merchant. Transaction servicer 414 is further configured to initiate detokenization of the received purchase transaction information, and route the detokenized transaction information to payment processor 210.

De-tokenizer 416 may be configured to detokenize received DPAN 203 values from acquiring bank 208 by way of network 240. De-tokenization module 216 is configured to perform detokenization by retrieving the original data, for example, a PAN or FPAN for a universal identifier or a particular card or account, from an encrypted token (DPAN 203 values) based on the token-to-PAN mapping that is stored in token vault database 440.

In some embodiments, de-tokenizer 416 may also perform tokenization of PAN values, and may store PAN values, for example, in token vault database 440 to use during de-tokenization. To tokenize, de-tokenizer 416 may be configured to replace a PAN with a surrogate value to form a token for storage in token vault database 440.

De-tokenizer 416 maintains token vault database 440. Token vault database 440 is a data storage, for example, a centralized secured server where tokens are created and the PAN number they correspond with are stored.

In use, user 201 may use a mobile wallet 205 of mobile device 204 to define default payment cards for a particular merchant during specific times, by way of a merchant map 600, to be stored and managed at TSP 202. The mappings data of merchant map 600 is stored in merchant map database 420 by transaction manager 412 of TSP 202 and used to de-tokenize a payment transaction by de-tokenizer 416.

In some embodiments, user 201 may use the mobile wallet 205 of mobile device 204 to make a payment transaction at POS 206 of a merchant, for example, by using NFC communications and using a DPAN 203. POS 206 transmits the transaction information to acquiring bank 208, and acquiring bank 208 sends transaction information to TSP 202 by way of network 240. The data transmitted may include DPAN 203, merchant ID code, transaction value, date & time stamp.

Figure 5:
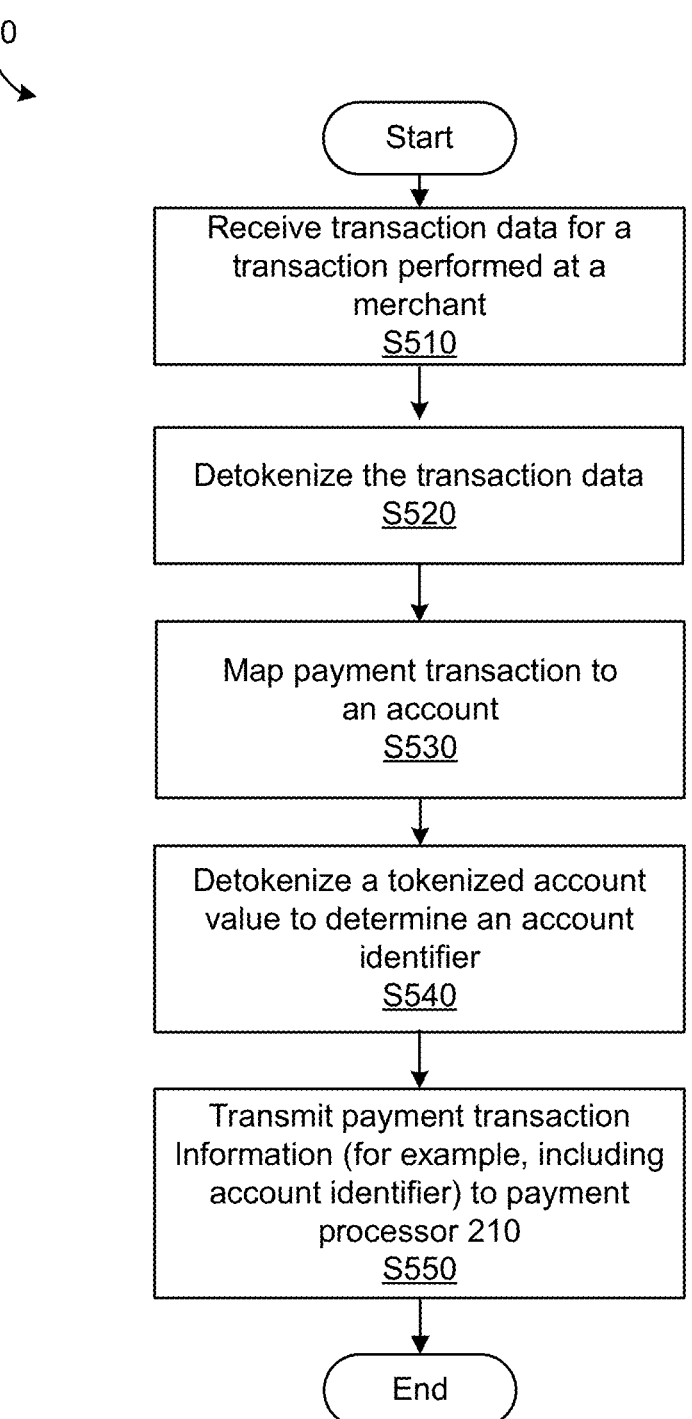
FIG. 5 is a flow chart of a method for processing a purchase transaction, performed by the software of FIG. 4.

FIG. 5 is a flow chart of a method 500 for processing a purchase transaction, performed by the software of FIG. 4. The blocks are provided for illustrative purposes. Variations of the blocks, omission or substitution of various blocks, or additional blocks may be considered.

A block S510, transaction servicer 414 receives, from acquiring bank 208 payment transaction information for a transaction at a merchant associated with POS 206. Transaction information may include, for example, a tokenized DPAN 203 for a universal identifier and an identifier of the merchant associated with POS 206.

At block S520, de-tokenizer 416 may then detokenize the received payment transaction information, including DPAN 203, by use of a token value such as token vault database 440, and thus may determine, for example, a received universal identifier. De-tokenizer 416 may also determine, from the transaction data, a received transaction variable.

At block S530, transaction manager 412 may then map the transaction to a card or account using a suitable lookup technique, for example, as provided in a merchant token map such as merchant map 600 stored in merchant map database 420. Transaction manager 412 may determine an account to assign to the transaction, based at least in part on merchant map 600 associated with the received universal identifier and the account in merchant map 600 that is associated with the received transaction variable. In an example, the received transaction variable may be an identifier of the merchant of POS 206, which in turn dictates which account to be used in the transaction. For example, as shown in merchant map 600 of FIG. 6, a transaction identified at "Merchant A" may be assigned to "Card 1".

In some embodiments, TSP 202 may leverage machine learning, learning based on historical transactions an account that is "home of best fit" for routine or repeat purchase transactions. In an example, TSP 202 may modify account mapping, which can be reflected in merchant map 600 or other suitable lookup technique, based on changes in purchase transaction behaviour of user 201.

In some embodiments, account mapping for a transaction may be to more than one account.

The account as determined at block S530, such as a lookup from a lookup table or merchant map 600, may be a tokenized value, for example, a tokenized FPAN, and thus, de-tokenizer 416 may, at block S540, be required to detokenize a tokenized FPAN for the card or account to be used, to acquire an FPAN, by accessing token vault database 440.

At block S550, account information, including, for example FPAN of the required card or account, may then be transmitted by transaction servicer 414 to payment processor 210, at which the transaction may then be authorized.

Payment processor 210 may then transmit a payment transaction notification to issuing bank 212 for financial authorization.

Once approved, an authorization response may then be sent from issuing bank 212 to payment processor 210, to TSP 202, to acquiring bank 208 by way of network 240, and finally to POS 206 at the merchant.

In some embodiments, an authorization response from issuing bank 212 may be sent to acquiring bank 208 and POS 206 at a merchant by way of network 240 or a suitable payment network.

In some embodiments, transaction manager 412 communicates with mobile device 204 to update merchant map database 420 with information to update merchant map 600 with merchant mapping information, for example, with newly-defined cards or accounts and based on user preferences.

It should be understood that the blocks may be performed in a different sequence or in an interleaved or iterative manner.

In some embodiments, software and/or hardware of a computing device may process a transaction, using method 500.

FIG. 6 illustrates an example of a merchant map 600 maintained by the software of TSP 202, including transaction manager 412 to map or assign an account to be used for a particular transaction. A separate merchant map 600 may be maintained and associated with each of multiple users. A user's merchant map 600 may be identified using a universal identifier. Merchant map 600 stores information about multiple cards or accounts associated with the user or universal identifier, indicating which account to be used when certain transaction variables are met. In some embodiments, the cards or accounts stored in merchant map 600 may be tokenized with a DPAN 203. In other embodiments, card or accounts stored in merchant map 600 may be listed by their full FPAN.

In the example shown in FIG. 6, transaction variables may include, for example, a merchant identifier, a day of week of the transaction, and a time of day of the transaction. Other transaction variables that may be used to define an account or card to be used for that type of transaction may include, for example, a merchant category or transaction defining the type of merchant or transaction taking place, for example, categorizing a merchant such as a hardware merchant or hardware purchase. Other transaction variables may include, for example, a size of the transaction (quantity or dollar amount) and mission category code ("MCC").

Thus, in the example shown in FIG. 6, a transaction completed at any time of day on a weekday at Merchant B is processed using Card 2. A transaction completed at any time of day on a weekend at Merchant B is processed using Card 3.

The association of certain transaction variables with particular cards or accounts may be defined by user 201 for the purpose of defining transaction that are for personal use, to assign them to a personal account, and those for business use, which can instead be assigned to a business account.

If a transaction variable such as a merchant has not been defined in merchant map 600, then transaction manager 412 may assign the transaction to a default account.

In some embodiments, transaction manager 412 may leverage machine learning, learning based on historical transactions an account that is "home of best fit" for routine or repeat purchase transactions, and may store such results in merchant map 600.

The machine learning logic may be able to, for example, based on history, derive patterns or purchase transactions to generate a model. In an example, a user at a hardware store may usually use Card 1, then transaction manager 412 may make the connection to automatically assign Card 1 to purchases made at another hardware store.

In some embodiments, transaction manager 412 may assign an account to a transaction on the basis of a user's previous transaction history, and assign the same account for a merchant transaction that was previously used for a previous transaction at the same merchant.

Transaction manager 412 may also associate particular transactions with particular accounts or cards on the basis of loyalty discount rewards that may be associated with a particular type of transaction, or other costs or terms associated with a card or account, such as foreign exchange rates.

In some embodiments, a transaction may be mapped to an account on the basis of a location of the transaction, such as the country in which a transaction is occurring, or in which the merchant operates. Location information, such as a country code, may be included in transaction information transmitted to TSP 202. Transaction manager 412 may thus map a transaction to an account applying a favourable foreign exchange rate for that transaction.

In some embodiments, merchant map 600 can be used to classify SKUs (stock keeping units) of a transaction, and transaction manager 412 may automatically classify transactions on the basis of the SKUs involved in the transaction, for example, being purchased by user 201.

In some embodiments, transaction manager 412 may utilize artificial intelligence techniques to predict which electronic payment network (for example, associated with a particular account), may be most favourable to a user. Prediction may be made on the basis of certain factors such as cost of using the network, and transaction manager 412 may select the least expensive option.

A user 201 may thus configure a merchant map 600 manually for an initial configuration, and transaction manager 412 may, over time, learn improved transaction mapping based at least in part on historical transactions. In some embodiments, user 201 may be prompted a question to confirm a transaction mapping.

In some embodiments, transaction manager 412 may be configured to encourage user 201 to use certain financial services products, by highlighting features or terms, such as promotional offers, that are available with certain accounts, and prompting the user to select that account based on a user's behaviours. For example, a user may be paying for a video streaming service with a first credit card. Transaction manager 412 may prompt a user to use a second credit card, which has a promotional offer of six free months for the video streaming service.

Prediction or machine learning algorithms may be implemented by transaction manager 412 and operate using data such as transaction details and transaction history. Thus, prediction manager 412 may be able to predict how to assign accounts for future transactions.

In some embodiments, clients or users 201 financial transactions may be monitored and machine learning and prediction techniques may be used to allow a user 201 to be notified even when the original plastic is used, for example, one of multiple accounts associated with a universal identifier is used directly, to optimize the user's benefit. Also, knowing the subscriptions for each card, new card info can be updated for subscriptions on behalf of users or let users know about new offers.

In an example, user 201 may perform optical character recognition (OCR) scanning or photographing of receipts from transactions, for example, using software local to mobile device 204 for use by transaction manager 412 or other components of payment ecosystem 200. User 201 or transaction manager 412 may continuously associate a specific transaction by merchant, SKU and/or dollar amount or percentage of whole as "personal", "business", or other suitable category. If an activity (such as assigning a type of transaction to a particular category or account) is repeated twice or a designated number of instances, user 201 may be prompted to select whether transactions of that type are always to be billed to the same destination account. Thus, any future transaction could be billed to that destination account.

In another example, at time of sign up (registration with a universal identifier or a universal card) or other suitable time, transaction history such as the last 30 to 90 days of transactions may be downloaded to mobile device 204 of user 201, for example, using Card Linking tech from Visa/ MasterCard. User 201 can confirm whether transactions have been processed on the correct account. In the event of errors, user 201 can identify the correct destination account for a transaction, or indicate if a transaction is business or personal. Thus, transaction manager 412 may be able to automate account mapping going forward for future transactions based on the data and account mapping verified by user 201. In some embodiments, for any new transactions, user 201 may be prompted to confirm if an account is to be used and if it is personal or business or mixture of the two. In the event of a mixture between a personal and business account, user 201 may be prompted to upload data relating to the transaction, such as uploading an image of the transaction receipt (such as by taking a picture with a camera of mobile device 204). Account mapping can thus be split across multiple accounts for a single transaction, such as between a personal account and a business account.

Conveniently, payment ecosystem 200 with account mapping may allow for one identifier or DPAN, such as one spending card (for e.g., associated with a universal identifier) for all business and personal affairs. A single timeline may be generated for all spending. It may also allow for a user to easily classify purchases, for example, at a merchant or a SKU level, to their "home of best fit" account or card, for example, separating business and personal expenses. In some embodiments, systems and methods described herein may automatically categorize purchases and map an account to be used for a particular purchase, for example, based on a decision made by transaction manager 412 on the basis of factors such as transaction history, transaction variables, and the like.

As such, payment ecosystem 200 may facilitate consumers such as small business owners to simplify spending— from transacting, to expense management and balancing their books—ultimately keeping financial affairs in order.

In some embodiments, it may be possible to update a "home of best fit" if a transaction is miscategorised, up to a designated number of days after the transaction takes place. SKUs, merchant, transaction date, transaction time, and other transaction variables may be classified to a "home of best fit", and automatically classified using an embedded machine learning engine. Payment ecosystem 200 may further generate cash flow insights to assist with budgeting and spending, based at least in part on purchase transactions recorded through the system.

Payment ecosystem 200 may be configured for global acceptance at merchants around the world, and may allow for integration with accounting software such as a cloud accounting platform, allowing a user to determine with ease the status of their accounts. A spending and transaction insights engine may also be incorporated, as well as mechanisms for paying bills or invoices.

Payment ecosystem 200 may also track loyalty or rewards programs and various expenses associated with various cards or accounts, such as exchange rates and transaction costs. Thus, transaction processing techniques described herein may provide for optimal selection of accounts for a particular transaction at a particular merchant, and thus may provide cost savings to a user.

Components of payment ecosystem 200 may operate as a token requester on a user's behalf, and the user may receive a tokenized DPAN provided by a third party token service administered by a financial services network such as Visa™ or Mastercard™. The resulting tokenization may reduce Payment Card Industry (PCI) compliance issues and reduce the ability for fraudulent activities to occur, as a user is not using a card or account directly. The transaction data sent during a purchase transaction is a tokenized DPAN provided by the financial services network.

Figure 7:
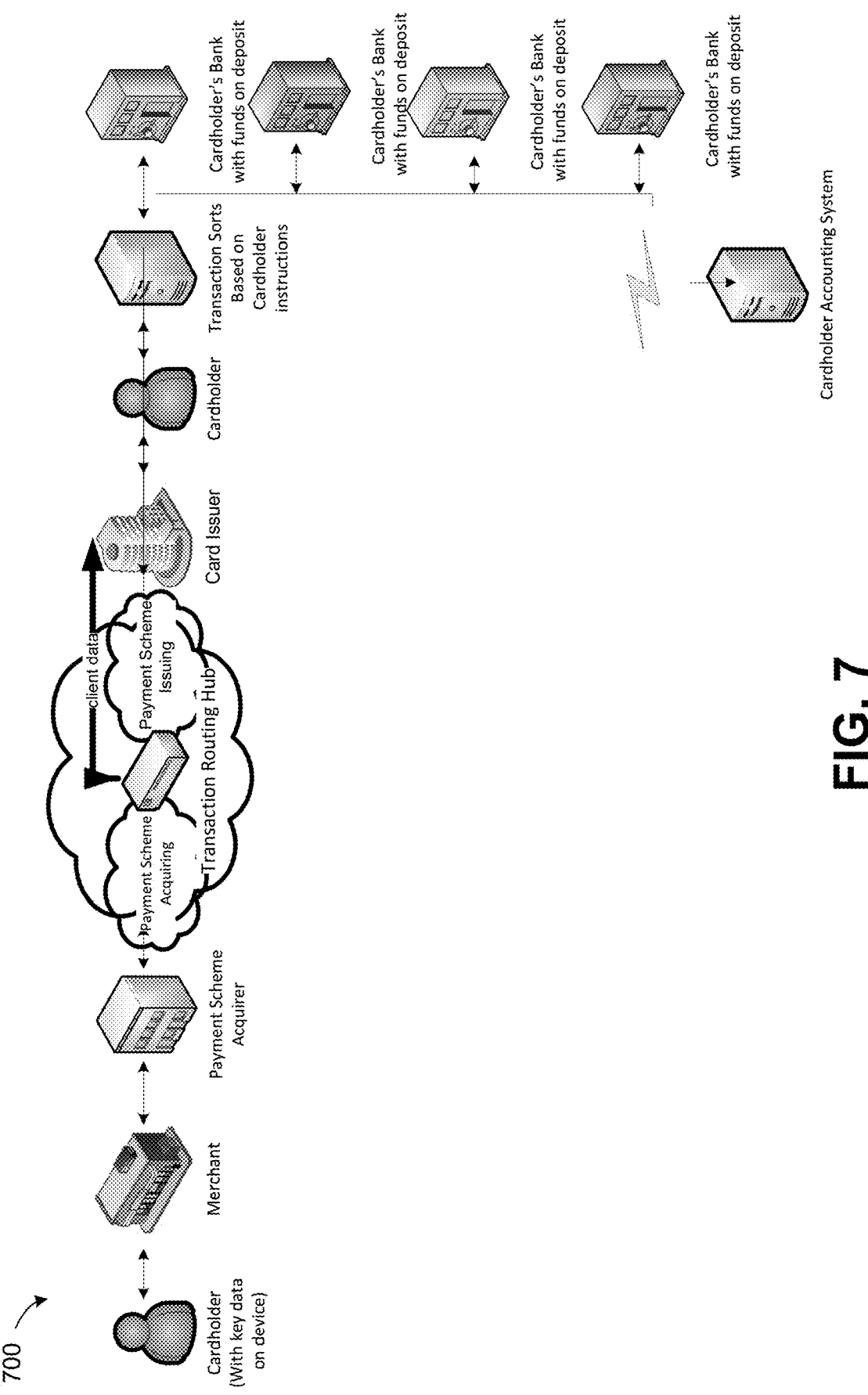
FIG. 7 is a schematic diagram of a payment ecosystem with account mapping, in accordance with an embodiment.

In accordance with another embodiment, a payment ecosystem 700 with merchant mapping (Enhanced Payment Scheme) is illustrated in FIG. 7. The Enhanced Payment Scheme operates on the basis of a cardholder as a universal identifier as described herein, in this case, a universal card. Such a product may enable one card to redirect and post to other issued cards owned by the same person.

Cardholder data may be tokenized as key data on a device such as mobile device 204 associated with a Cardholder, such as user 201, for use at a POS 206 at a Merchant. The Cardholder may be able to use funds on the card anywhere the payment scheme is accepted.

Using key data to make a payment transaction, the merchant sends transaction information to Payment Scheme Acquirer, such as acquiring bank 208.

Payment Scheme Acquirer sends transaction information to a routing hub, such as Transaction Routing Hub, for example, by way of network 240. The Transaction Routing Hub may be a suitable computing device, such as described herein.

The Transaction Routing Hub may perform Payment Scheme Acquiring and Payment Scheme Issuing, as well as perform changes for Payment Transaction Data (ISO format). For example, new data fields may be added such as: card bank Identification Number (BIN), posted bank BIN; payment schemes to create a product that supports this transaction end to end—preserving payment integrity; and new product transaction type.

In some embodiments, the Transaction Routing Hub may also detokenize data, as necessary, using techniques as described herein.

In some embodiments, the Transaction Routing Hub can communicate with a network (such as Visa™/MC™/Interac™) TSP, or TSP 202, to tokenize the transaction.

The Transaction Routing Hub may send client data to the Card Issuer, such as issuing bank 212.

Set up & Ongoing Manage Transaction Sorting may include the Cardholder downloading bank transactions, confirming which bank account transaction post to, and the Cardholder being given the opportunity to change the destination of transactions. Any merchant transactions that are a combination of business and personal may be redirected to a solution to update Cardholder Accounting System.

Transaction receipts with SKU level data may be used to send updates to the accounting system to manage based on instructions from the Cardholder.

Payment transaction notification may be sent to Cardholder's Bank, such as issuing bank 212, for financial authorization.

Conveniently, transactions made with a universal card can appear on the account associated with the universal card but are posted to an account of choice owned by the Cardholder. Disputes and chargebacks can be initiated using either the universal card or the bank account with the posted transaction. Interchange earned involves bank with the posted transaction. The integrity of the payment transaction for the merchant and the Cardholder is supported by the Operating Regs between the universal card issuer, Posted Transaction Issuer, Payment Scheme and Acquirer.

Of course, the above described embodiments are intended to be illustrative only and in no way limiting. The described embodiments are susceptible to many modifications of form, arrangement of parts, details and order of operation. The disclosure is intended to encompass all such modification within its scope, as defined by the claims.

What is claimed is:

1. A computer-implemented method for tokenized inter-process data message routing based at least on for-token transformation conducted dynamically by a token service provider computing device during processing of a transaction authorization request data message for a transaction of funds between a cardholder's corresponding issuer host server and a merchant's corresponding acquirer host server, the method comprising:

generatings, by the token service provider computing device maintaining a centralized token vault data storage, tokenized universal identifier associated with one or more payment token data objects, each payment token data object having a surrogate value data field that replaces a primary account number (PAN) data field, the tokenized universal identifier configured for transmission across a near-field communication system to a merchant device electronically coupled to the acquirer host server, each payment token data object corresponding to an underlying individual verified payment token and the primary account number (PAN) data field issued by the issuer host server and each tokenized universal identifier being stored locally on a digital wallet residing on a user's mobile device;

persisting, by the token service provider computing device, a dynamically updatable merchant map data object comprising a plurality of electronic records associated with each merchant identified by a merchant identifier data field, each electronic record comprising a transaction characteristic variable data field and one or more corresponding merchant transaction preferences configured by the merchant, the one or more corresponding merchant transaction preferences indicating the merchant's preferred method of payment under one or more conditions in the transaction characteristic variable data field;

persisting, by the token service provider computing device, a machine-learning enabled mapping model trained on the dynamically updatable merchant map data object, the machine-learning enabled mapping model optimized and validated using the dynamically updatable merchant map data object;

inputting, by the token service provider computing device, historic transactions to the machine-learning enabled mapping model operating in classification mode to determine the merchant transaction preferences, the token service provider computing device updating the merchant transaction preferences for the dynamically updatable merchant map data object using an output of the machine-learning enabled mapping model;

receiving from the acquirer host server, by the token service provider via a communication network, the transaction authorization request data message comprising a transaction data for a transaction performed at the merchant device using the tokenized universal identifier transmitted across the near-field communication system, the transaction data comprising the tokenized universal identifier, the merchant identifier data field, and a transaction characteristic variable data field;

detokenizing, by the token service provider computing device, the tokenized universal identifier in the transaction authorization request data message, the token service provider computing device determining the one or more underlying payment token data objects based on a token-to-universal identifier mapping stored in the token vault database;

traversing, by the token service provider computing device, the merchant map data object maintained by the token service provider; and retrieving the underlying merchant transaction preference matching the merchant identifier data field in the merchant map data object;

inputting, by the token service provider computing device, the transaction authorization request data message to the machine-learning enabled mapping model operating in inference mode, the machine-learning enabled mapping model determining one or more payment token data objects for the transaction based on the merchant transaction preferences and the transaction characteristic variable data field;

obtaining, by the token service provider computing device, from the centralized token vault data storage, the one or more corresponding primary account number (PAN) data fields corresponding to the selected one or more payment token data objects, and sending, via the communication network, one or more authorization data messages including the selected one or more payment tokens data objects to one or more corresponding remote payment processors to authorize the transaction;

transferring funds, between the issuer host server and the acquirer host server, according to an activity net balance determined by an aggregate of the one or more authorization data messages corresponding to each primary account number (PAN); and receiving, by the token service provider computing device, a user input from the cardholder or the merchant representative of transaction miscategorization, the token service provider computing device updating the machine-learning enabled mapping model using the user input.

2. The computer-implemented method of claim 1, wherein the tokenized universal identifier (DPAN) is a unique identifier of a user.

3. The computer-implemented method of claim 1, wherein the selecting includes performing a lookup of a lookup table.

4. The computer-implemented method of claim 1, wherein the selecting includes performing a lookup on the electronic merchant map data object associated with the tokenized universal identifier (DPAN).

5. The computer-implemented method of claim 1, wherein the transaction characteristic variable data field includes a date of the transaction.

6. The computer-implemented method of claim 1, wherein the transaction characteristic variable data field includes a time of the transaction.

7. The computer-implemented method of claim 1, wherein the transaction characteristic variable data field includes a location of the transaction.

8. The computer-implemented method of claim 1, further comprising: categorizing the transaction based at least in part on the merchant identifier data field and wherein the selecting is based at least in part on the categorization of the transaction.

9. The computer-implemented method of claim 1, wherein the selecting is based at least in part on terms associated with each of the one or more corresponding underlying individual verified payment tokens.

10. The computer-implemented method of claim 1, wherein the selecting is based at least in part on costs associated with each of the one or more corresponding underlying individual verified payment tokens.

11. The computer-implemented method of claim 1, further comprising: receiving an authorization response from the remote payment processor and sending the authorization response to an acquiring financial institution.

12. The computer-implemented method of claim 1, wherein the selected account is tokenized.

13. The computer-implemented method of claim 12, further comprising: de-tokenizing the selected account prior to sending account information to the remote payment processor.

14. The computer-implemented method of claim 1, further comprising: upon none of the multiple accounts is associated with the universal identifier, the merchant identifier data field, and the transaction characteristic variable data field, selecting a default account.

15. The computer-implemented method of claim 1, wherein the selecting is based at least in part on learning a model based on historical transactions associated with the universal identifier data field.

16. The computer-implemented method of claim 15, further comprising: receiving a confirmation that a user approves the selected account.

17. The computer-implemented method of claim 16, further comprising: updating the model based on the confirmation.

18. The computer-implemented method of claim 1, further comprising: tokenizing the universal identifier and sending the tokenized universal identifier to a computing device associated with a user.

19. A computer system for tokenized inter-process data message routing based at least on token transformation conducted dynamically by a token service provider computing device during processing of a transaction authorization request data message for a transaction of funds between a cardholder's corresponding issuer host server and a merchant's corresponding acquirer host server, the computer system comprising:

a computer processor coupled to computer memory, the computer processor configured to:

generate, by the token service provider computing device maintaining a centralized token vault data storage, a tokenized universal identifier associated with one or more payment token data objects, each payment token data object having a surrogate value data field that replaces a primary account number (PAN) data field, the tokenized universal identifier configured for transmission across a near-field communication system to a merchant device electronically coupled to the acquirer host server, each payment token data object corresponding to an underlying individual verified payment token and the primary account number (PAN) data field issued by the issuer host server and each tokenized universal identifier being stored locally on a digital wallet residing on a user's mobile device;

persist, by the token service provider computing device, a dynamically updatable merchant map data object comprising a plurality of electronic records associated with each merchant identified by a merchant identifier data field, each electronic record comprising a transaction characteristic variable data field and one or more corresponding merchant transaction preferences configured by the merchant, the one or more corresponding merchant transaction preferences indicating the merchant's preferred method of payment under one or more conditions in the transaction characteristic variable data field; persist, by the token service provider computing device, a machine-learning enabled mapping model trained on the dynamically updatable merchant map data object, the machine-learning enabled mapping model optimized and validated using the dynamically updatable merchant map data object;

input, by the token service provider computing device, historic transactions to the machine-learning enabled mapping model operating in classification mode to determine the merchant transaction preferences, the token service provider computing device updating the merchant transaction preferences for the dynamically updatable merchant map data object using an output of the machine-learning enabled mapping model;

receive from the acquirer host server, by the token service provider via a communication network, the transaction authorization request data message comprising a transaction data for a transaction performed at the merchant device using the tokenized universal identifier transmitted across the near-field communication system, the transaction data comprising the tokenized universal identifier, the merchant identifier data field, and a transaction characteristic variable data field;

detokenize, by the token service provider computing device, the tokenized universal identifier in the transaction authorization request data message, the token service provider computing device determining the one or more underlying payment token data objects based on a token-to-universal identifier mapping stored in the token vault database; traverse, by the token service provider computing device, the merchant map data object maintained by the token service provider and retrieving the underlying merchant transaction preference matching the merchant identifier data field in the merchant map data object; input, by the token service provider computing device, the transaction authorization request data message to the machine-learning enabled mapping model operating in inference mode, the machine-learning enabled mapping model determining one or more payment token data objects for the transaction based on the merchant transaction preferences and the transaction characteristic variable data field;

obtain, by the token service provider computing device, from the centralized token vault data storage, the one or more corresponding primary account number (PAN) data fields corresponding to the selected one or more payment token data objects, and sending, via the communication network, one or more authorization data messages including the selected one or more payment token data objects to one or more corresponding remote payment processors to authorize the transaction;

transfer funds, between the issuer host server and the acquirer host server, according to an activity net balance determined by an aggregate of the one or more authorization data messages corresponding to each primary account number (PAN); and receive, by the token service provider computing device, a user input from the cardholder or the merchant representative of transaction miscategorization, the token service provider computing device updating the machine-learning enabled mapping model using the user input.

20. A non-transitory computer-readable medium having computer executable instructions stored thereon for execution by one or more computing devices, that when executed by the processor perform the method for tokenized inter-process data message routing based at least on token transformation conducted dynamically by a token service provider computing device during processing of a transaction authorization request data message for a transaction of funds between a cardholder's corresponding issuer host server and a merchant's corresponding acquirer host server, the method comprising:

generating, by the token service provider computing device maintaining a centralized token vault data storage, a tokenized universal identifier associated with one or more payment token data objects, each payment token data object having a surrogate value data field that replaces a primary account number (PAN) data field, the tokenized universal identifier configured for transmission across a near-field communication system to a merchant device electronically coupled to the acquirer host server, each payment token data object corresponding to an underlying individual verified payment token and the primary account number (PAN) data field issued by the issuer host server and each tokenized universal identifier being stored locally on a digital wallet residing on a user's mobile device;

persisting, by the token service provider computing device, a dynamically updatable merchant map data object comprising a plurality of electronic records associated with each merchant identified by a merchant identifier data field, each electronic record comprising a transaction characteristic variable data field and one or more corresponding merchant transaction preferences configured by the merchant, the one or more corresponding merchant transaction preferences indicating the merchant's preferred method of payment under one or more conditions in the transaction characteristic variable data field;

persisting, by the token service provider computing device, a machine-learning enabled mapping model trained on the dynamically updatable merchant map data object, the machine-learning enabled mapping model optimized and validated using the dynamically updatable merchant map data object;

inputting, by the token service provider computing device, historic transactions to the machine-learning enabled mapping model operating in classification mode to determine the merchant transaction preferences, the token service provider computing device updating the merchant transaction preferences for the dynamically updatable merchant map data object using an output of the machine-learning enabled mapping model;

receiving from the acquirer host server, by the token service provider via a communication network, the transaction authorization request data message comprising a transaction data for a transaction performed at the merchant device using the tokenized universal identifier transmitted across the near-field communication system, the transaction data comprising the tokenized universal identifier, the merchant identifier data field, and a transaction characteristic variable data field;

detokenizing, by the token service provider computing device, the tokenized universal identifier in the transaction authorization request data message, the token service provider computing device determining the one or more underlying payment token data objects based on a token-to-universal identifier mapping stored in the token vault database;

traversing, by the token service provider computing device, the merchant map data object maintained by the token service provider and retrieving the underlying merchant transaction preference matching the merchant identifier data field in the merchant map data object;

inputting, by the token service provider computing device, the transaction authorization request data message to the machine-learning enabled mapping model operating in inference mode, the machine-learning enabled mapping model determining one or more payment token data objects for the transaction based on the merchant transaction preferences and the transaction characteristic variable data field;

obtaining, by the token service provider computing device, from the centralized token vault data storage, the one or more corresponding primary account number (PAN) data fields corresponding to the selected one or more payment token data objects, and sending, via the communication network, one or more authorization data messages including the selected one or more payment token data objects to one or more corresponding remote payment processors to authorize the transaction;

transferring funds, between the issuer host server and the acquirer host server, according to an activity net balance determined by an aggregate of the one or more authorization data messages corresponding to each primary account number (PAN); and receiving, by the token service provider computing device, a user input from the cardholder or the merchant representative of transaction miscategorization, the token service provider computing device updating the machine-learning enabled mapping model using the user input.

* * * * *